Aug. 21, 1951  H. P. STEWART  2,565,277
LETTER SCALE
Filed Sept. 17, 1946
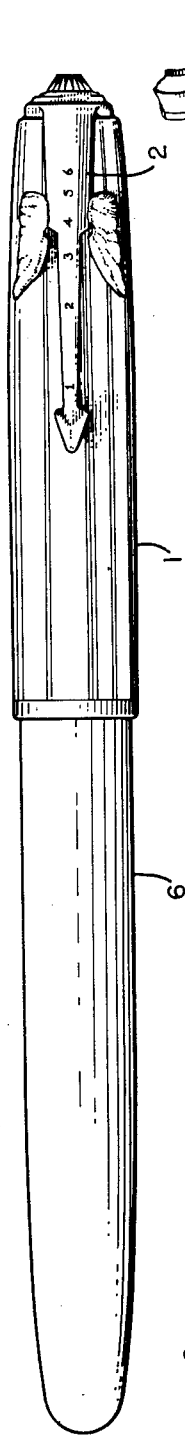
FIG. 1.
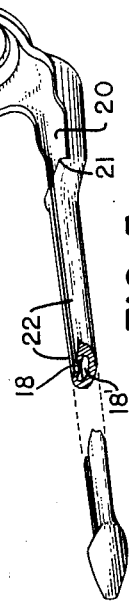
FIG. 5.
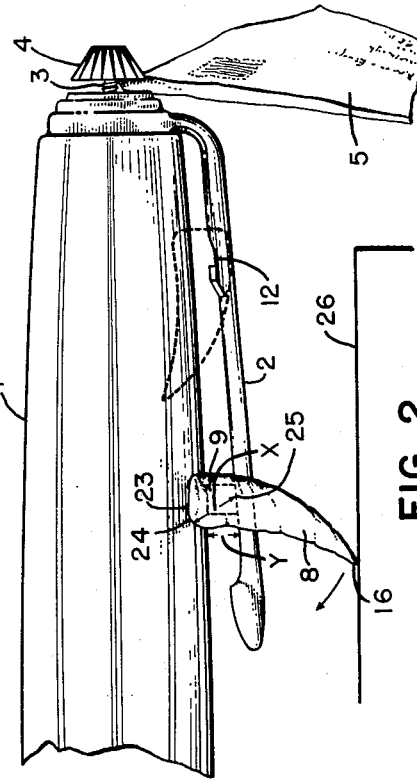
FIG. 2.
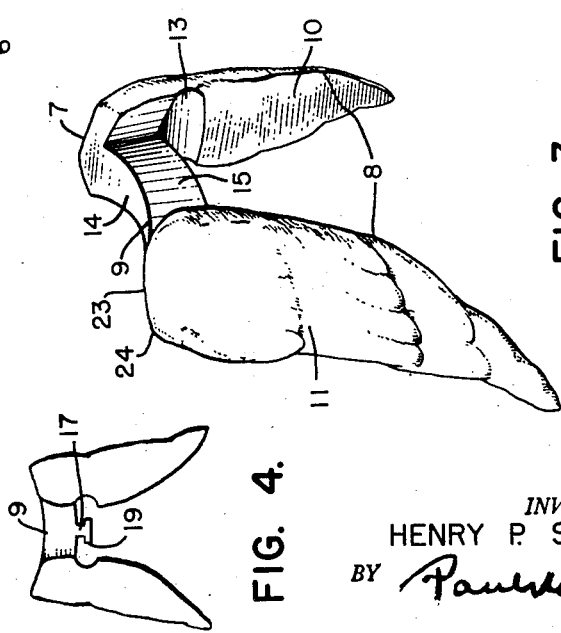
FIG. 3.
FIG. 4.
INVENTOR.
HENRY P. STEWART
BY Paul Polinsky
ATTORNEY Patented Aug. 21, 1951

2,565,277

UNITED STATES PATENT OFFICE 2,565,277

LETTER SCALE

Henry P. Stewart, New York, N. Y.

Application September 17, 1946, Serial No. 697,439

2 Claims. (Cl. 265—53)

1

This invention relates to new and useful improvements in portable weighing devices and, in particular, to a fulcrum for changing an ordinary pocket instrument, such as a fountain pen, into a weighing scale.

The object of my invention is to provide a simple attachment for an ordinary pocket instrument, such as a fountain pen, pencil, etc., so as to permit its use as a weighing scale for light articles, such as letters, in addition to its normal use as a writing instrument or the like.

With this object in view, I provide a movable fulcrum which may be readily attached to or detached from the customary clip provided near one end of a pocket instrument. The fulcrum is held between the clip and the cap of the instrument. The elements of the fulcrum are shaped so as to conform to the outside surface of the cap, whether the fulcrum is in weighing position or stowed.

When the fulcrum is in weighing position it is turned so as to be substantially at right angles to the axis of the cap. The article to be weighed is secured to the end of the pen to which the clip is attached by suitable means, such as a screw. The points of the prongs of the fulcrum are put in contact with a flat surface, such as a table, and laterally moved along the surface of the cap until the weight of the article being weighed balances the pen. Calibrations are inscribed along the outer surface of the clip so that the weight of the article may be readily determined.

The fulcrum is stowed by turning it down so that its points lie flush against the cap. A notch in the underside of the clip may be provided so as to hold the fulcrum when stowed.

According to one embodiment of my invention a slot is provided along the under surface of the clip which acts as a guiding means for a lug projecting from the fulcrum. The slot and lug hold the fulcrum upright in the weighing position.

These and other features of my invention will more clearly appear from the following detailed description of two embodiments thereof, and the appended claims.

In the drawings:

Fig. 1 is a front elevation of the fulcrum attached to a fountain pen;

Fig. 2 is a side elevation of the fulcrum in working position;

Fig. 3 is a perspective view of the fulcrum;

Fig. 4 is a modification of the fulcrum showing the lug; and

Fig. 5 is a modification of the clip showing the slot in which the lug fits.

2

In Fig. 1, 1 is a customary cap of a pocket instrument, such as a fountain pen, which is provided with a clip 2, customarily used for holding the instrument in the pocket. As shown in Fig. 2, a screw 3 having knurled head 4 screws into the free end of cap 1, and an article, such as an envelope 5, may be inserted between knurled head 4 and the end of cap 1 and clamped in place.

Clip 2 has inscribed along its exterior surface figures (1, 2, 3, 4, 5, 6) which may represent a scale of weights in ounces. The location of the figures along the clip is preferably determined with the pen half full of ink and in writing condition, i. e. nib end of barrel 6 out and cap 1 over the opposite end of the barrel.

7 is the fulcrum used in balancing the pen on a table or other horizontal surface and comprises two wing-shaped prongs 8 joined near one end by a crosspiece or bridge 9 (Fig. 3). Fulcrum 7 is preferably made of metal but wood, plastic or other materials may be used. Prongs 8 are shaped into a body so that inside surface 10 of each prong will conform substantially to an axial section of cap 1, which in this case is cylindrical. When fulcrum 7 is in the stowed position, prongs 8 will hug the surface of the cap and slide along it easily. The outside surfaces 11 of prongs 8 are also rounded so as to leave no sharp projections. When the pen and fulcrum are placed in one's pocket the fulcrum will not protrude beyond the clip and catch on articles of clothing.

Bridge 9 of fulcrum 7 is shaped so as to fit between clip 2 which is resilient and cap 1. The bridge may be pushed under the clip until it reaches notch 12 (Fig. 2) provided in the inner surface of clip 2. Grooves 13 (Fig. 3) are provided in surfaces 10 of the fulcrum just beneath bridge 9 and cooperate with notch 12 in locking the fulcrum when in the stowed position.

The surfaces of bridge 9 conform to cap 1 whether the fulcrum 7 is in working or stowed position. When the fulcrum is in working position, it is opened so as to be substantially at right angles to the axis of cap 1, and top surface 14 partially engages cap 1. Surface 14 is curved to conform to a radial section of the cap. The bottom surface (not shown) of the bridge may be straight or curved substantially parallel to top surface 14 and engages the clip forcing it up, thereby frictionally holding the fulcrum between clip and cap. The surfaces 15 (only one of which is shown) do not touch the cap or clip with the fulcrum open. When the fulcrum is stowed it is closed so as to be flush against the cap, and the top and bottom surfaces of the bridge do not touch the cap or clip. The lower side surface (not shown) is curved to conform to a radial section of cap 1 similarly to surface 14, and upper side surface 15 may be straight or curved substantially parallel to the lower side surface and engages the clip similarly to the bottom surface of the bridge described above.

Opened fulcrum 7 is securely held against cap 1 and will not tip over because the bridge 9 is thicker than the normal distance between the inner surface of clip 2 and the surface of cap 1 and is held by the clamping action between these two parts. Additional stability is given to the open fulcrum by virtue of the fact that distance X between the point of contact 24 of the forward end of prong base 23 with cap 1 and midpoint 25 of bridge 9 contacting the cap is greater than Y, the perpendicular distance between the opposed surfaces of the clip and cap. In order to lower the fulcrum in the direction indicated by the arrow (Fig. 2), X would have to be rotated through the perpendicular position between the clip and cap and, since X is greater than Y, it requires spreading the clip farther from the cap. Normally the spreading operation can be performed only by hand; therefore, in the ordinary course of use the fulcrum will remain opened.

To put fulcrum 7 into working position from stowed position, as shown by the dotted lines in Fig. 2, clip 2 is slightly raised so as to permit disengagement of the fulcrum from notch 12. The fulcrum is then opened to the position shown by the solid lines. The pen is placed near the edge of a table 26, with knurled head 4 projecting from the edge. The article to be weighed, such as envelope 5, is clamped to head 4 and permitted to hang free. The fulcrum is moved along the clip until the article 5 is balanced, i. e. the pen no longer touches the table and only points 16 of prongs 8 are in contact with the table. With the fulcrum in this position, points 16 are in the same horizontal plane as one another but, because of the curvature of the prongs, the points are in a different vertical as well as horizontal plane from bridge 9. The weight of the envelope is read off the scale inscribed on the clip with reference to top surface 14 of the bridge.

Figs. 4 and 5 show a modification of my invention in which a lug 17 is provided in the bottom surface of bridge 9. The edges of the under surface of clip 2 are formed into two lips 22, thus providing a slot 18 between them which is narrower than head 19 of lug 17 and a wider opening 18' below 18 into which head 19 may slide. At 20 slot 18 opens and is wider than head 19. Grooves 13 in the inside surfaces of prongs 8 will help keep the fulcrum in position by resting against shoulders 21 enclosing opening 20 when the fulcrum is stowed. In addition, grooves 13 will also keep the fulcrum locked in the stowed position and prevent its getting disengaged from the slot and, perhaps, subsequently lost. Fulcrum 7 can be changed from one position to the other only when bridge 9 is at 20, at which point head 19 of lug 17 can enter opening 18'.

While I have described my invention with particular relation to a fountain pen, the principles of my invention are equally applicable to many other types of pocket instruments, such as pencils and flashlights, whose outside surfaces are usually cylindrical, by which I mean bodies having round, octagonal, hexagonal, etc. cross sections.

What I claim is:

1. A portable weighing device of the kind described comprising a cap, a clip with an inner surface having a wide and a narrow portion, said clip attached at one end of said cap, means for fastening the articles to be weighed at said one end, a fulcrum having two prongs and movable between the clip and cap either parallel with the axis of the cap or upright and substantially at right angles to the axis, a bridge connecting said prongs and having a lug which can enter said narrow portion when the fulcrum has been turned at right angles to the axis while in said wide portion.

2. A fulcrum for attachment to a fountain pen or similar device containing a clip extending parallel thereto for converting it to a weighing scale comprising a bridge member shaped on two sides to conform to the body of the device to be converted, said bridge having integral therewith at its ends two prongs extending transversely thereto, the prongs having points on their free ends to serve as a pivot, the bridge member being of a size insertable between the clip and the body of the device and pivotal from an inoperative position substantially parallel to the body of the device to a weighing position substantially perpendicular to the clip and body.

HENRY P. STEWART.

REFERENCES CITED

The following references are of record in the file of this patent:

UNITED STATES PATENTS

| Number | Name | Date |
|---|---|---|
| 1,201,063 | Litchfield | Oct. 10, 1916 |
| 2,502,680 | Stewart | Apr. 4, 1950 |